United States Patent
Fonda

(10) Patent No.: US 7,368,174 B2
(45) Date of Patent: May 6, 2008

(54) AQUEOUS DISPERSION COATING COMPOSITION HAVING NOISE AND/OR FRICTION ABATEMENT PROPERTIES

(75) Inventor: James B. Fonda, Cary, NC (US)

(73) Assignee: Lord Corporation, Cary, NC (US)

( * ) Notice: Subject to any disclaimer, the term of this patent is extended or adjusted under 35 U.S.C. 154(b) by 306 days.

(21) Appl. No.: 11/300,511

(22) Filed: Dec. 14, 2005

(65) Prior Publication Data

US 2007/0134502 A1    Jun. 14, 2007

(51) Int. Cl.
*B32B 9/04* (2006.01)

(52) U.S. Cl. ............... 428/447; 428/423.1; 428/423.9; 428/424.8; 428/515; 428/517; 525/100; 525/101; 525/106; 525/453; 525/455; 525/474

(58) Field of Classification Search ............ None
See application file for complete search history.

(56) References Cited

U.S. PATENT DOCUMENTS

| | | | |
|---|---|---|---|
| 4,572,871 A | 2/1986 | Mabuchi et al. |
| 4,572,872 A | 2/1986 | Yamazaki et al. |
| 4,720,518 A | 1/1988 | Chihara et al. |
| 4,902,767 A | 2/1990 | Roitman et al. |
| 4,945,123 A | 7/1990 | Miyama et al. |
| 4,987,204 A | 1/1991 | Murachi |
| 5,343,655 A | 9/1994 | Miyakawa et al. |
| 5,447,671 A | 9/1995 | Kato et al. |
| 5,488,092 A | 1/1996 | Kausch et al. |
| 5,525,427 A | 6/1996 | Griswold et al. |
| 5,525,660 A | 6/1996 | Shiono et al. |
| 5,674,567 A | 10/1997 | Kausch et al. |
| 5,763,011 A | 6/1998 | Miyama et al. |
| 5,844,051 A | 12/1998 | Onzuka et al. |
| 6,084,034 A | 7/2000 | Miyama et al. |
| 6,406,785 B1 | 6/2002 | Janes et al. |
| 6,534,147 B2 | 3/2003 | Gopalan |
| 6,590,027 B2 | 7/2003 | Sato et al. |
| 6,682,779 B1 | 1/2004 | Wefringhaus et al. |
| 6,742,784 B2 | 6/2004 | Sakane et al. |
| 2002/0064660 A1 | 5/2002 | Janes et al. |
| 2002/0160203 A1 | 10/2002 | Robertson |
| 2005/0003158 A1 | 1/2005 | Yamasa et al. |
| 2005/0085586 A1 | 4/2005 | Sydes et al. |
| 2005/0215654 A1 | 9/2005 | Wright et al. |
| 2006/0222870 A1 | 10/2006 | Inokuchi |

FOREIGN PATENT DOCUMENTS

| | | | |
|---|---|---|---|
| EP | 1325947 A | | 7/2003 |
| JP | 58071233 | | 4/1983 |
| JP | 61138636 | | 6/1986 |
| JP | 61138637 | | 6/1986 |
| JP | 61138638 | | 6/1986 |
| JP | 61138639 | | 6/1986 |
| JP | 61155431 | | 7/1986 |
| JP | 61155432 | | 7/1986 |
| JP | 61225222 | | 10/1986 |
| JP | 8225670 | | 9/1996 |
| JP | 2001-039233 | * | 2/2001 |
| JP | 2001-039233 A | | 2/2001 |
| WO | 2004/099327 A | | 11/2004 |

* cited by examiner

*Primary Examiner*—Marc S. Zimmer
(74) *Attorney, Agent, or Firm*—Todd W. Galinski

(57) ABSTRACT

An aqueous dispersion coating for rubber and polymer substrates comprises a blend of a polysiloxane and a curable polyurethane and various additives such as a urethane crosslinking agent, a heat resistant filler, and the like. The aqueous dispersion coating reduces the noise upon contact or movement of the coated substrate with an article and maintains the initial static coefficient of friction therewith over a period of time. A desired end use is as a coating on vehicle weatherstrips such as for doors, trunks, and other enclosing articles.

27 Claims, 1 Drawing Sheet

AQUEOUS DISPERSION COATING COMPOSITION HAVING NOISE AND/OR FRICTION ABATEMENT PROPERTIES

FIELD OF THE INVENTION

The present invention relates to a substantially organic solvent free aqueous composition that when applied as a coating to a rubber or polymer substrate such as a vehicle weatherstrip reduces the amount of noise of the substrate upon contact with an article and maintains the initial static coefficient of friction therewith over a period of time.

BACKGROUND OF THE INVENTION

Heretofore, vehicle weatherstrips while providing a barrier to exterior elements such as wind, rain, snow, and sleet, have generally not diminished, and can even contribute to, the interior noise level of the vehicle. Vehicles thus have had an interior noise level often well above 40 dBA.

Vehicle weatherstrips, such as automotive weatherstrips, have been coated for several years, initially with solvent borne urethane systems and more recently with aqueous urethane systems. While such coatings must pass a variety of automotive performance tests (varies depending upon the Original Equipment Manufacturer (OEM), they generally have an undesirable noise level. Moreover, retention of low coefficient of friction (COF) values is generally not maintained because the coating contains various fillers such as waxes or silicones which migrate to the surface of the weatherstrip and eventually are removed and result in an increased coefficient of friction.

Japanese Abstract 61155432 relates to obtaining a coating composition which, when applied to the surface of a polymeric elastomer such as an object, especially, a nonpolar rubber, allegedly improves the adhesion, lubricity, water repellency, resistance to freezing, abrasion resistance, etc., of the elastomer, by using a curable polyurethane, a curable silicone and a tackifier as the principal components of the coating composition.

Japanese Abstract 61155431 relates to obtaining a coating composition, which, when applied to the surface of an nonpolar polymeric elastomer such as EPT rubber, can allegedly improve its adhesion, lubricity, water repellency, abrasion resistance, resistance to freezing, etc., by using curable polyurethane, a polyorganosiloxane composition and a tackifying agent as the principal components of the coating composition.

Japanese Abstract 61138636 relates to providing a composition containing a curable polyurethane composed of a polyvalent isocyanate and a polyol and a curable silicone as the film-forming elements, giving a firm bond by one-coat treatment, and forming a surface allegedly having excellent slipperiness, water-repellency, sound-proofing property and abrasion resistance.

Japanese Abstract 58071233 relates to preventing friction noise and allegedly improve sliding resistance and adhesion by forming a covering fixing coat using a surface treating agent containing polymer with a specific compounding for polyurethane coating material.

U.S. Pat. No. 6,742,784 relates to a weather strip or glass run for an automotive vehicle. The weather strip comprises a main body formed of an elastomer. A slidably contacting section to which a part other than the weather strip is slidably contactable is fixedly formed on the main body and contains a material having at least one of hydrophilicity and water absorbability. The slidably contacting section may be integral with the main body to form a one-piece structure, in which the slidably contacting section is formed of the elastomer, and the elastomer of the main body and the slidably contacting section contain the material having at least one of hydrophilicity and water absorbability.

BRIEF DESCRIPTION OF THE DRAWING

The drawing relates to a cross-sectional view of a typical vehicle weatherstrip having a coating of the present invention thereon.

SUMMARY OF THE INVENTION

Figure 1:
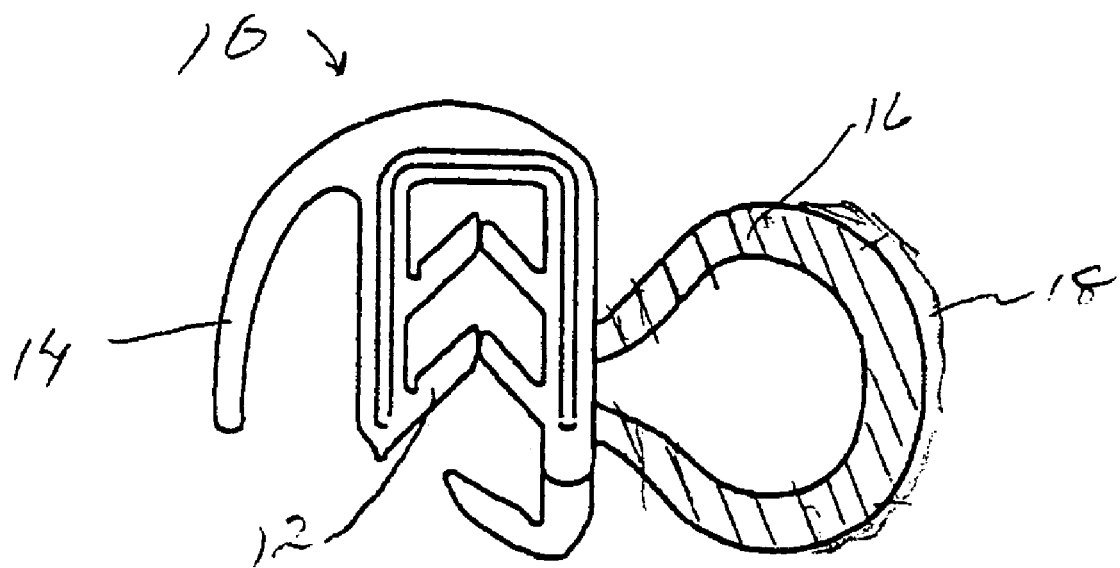

An aqueous dispersion composition as a coating for a rubber or a polymer comprises a polymer blend including at least one polysiloxane per se in an amount of from about 50% to about 85% by weight and at least one heat curable polyurethane per se derived from an aliphatic diisocyanate in an amount of from about 15% to about 50% by weight based upon the total weight of all of said polysiloxane and all of said polyurethane polymers. Various fillers such as a high heat resistant high molecular weight polyolefin polymer are incorporated in an amount of from about 5 to about 35 parts by weight based upon the total weight of the polymer solids such as the at least one polysiloxane and the at least one heat curable polyurethane. Other fillers such as various polyamides, silicas, polytetrafluoroethylene, silicone rubber powder and ceramic spheres generally reduce dry noise values, but do not generally reduce wet noise values. The resulting dispersion coating is substantially free of organic solvents and upon application to a polymer or rubber substrate such as an EPDM weatherstrip lowers the interior noise level of a vehicle to less than about 38 dBA. The coatings also provide a low friction surface that, unlike typical coated weatherstrips, will not increase over time.

DETAILED DESCRIPTION OF THE INVENTION

The physical aqueous dispersion coating composition of the present invention contains at least one polysiloxane preferably in the form of an aqueous dispersion having at least one repeat unit having the formula:

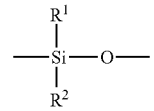

wherein $R^1$ and $R^2$, independently, is an alkyl having from 1 to about 4 carbon atoms with a methyl group. Accordingly, (polydimethyl siloxane) is a preferred polysiloxane. The one or more polysiloxanes provide abrasion resistance and reduce coefficient of friction values once the coating has been applied to a substrate and cured. Suitable number average molecular weights generally range from about 100,000 to about 500,000 and desirably from about 200,000 to about 400,000. Such polysiloxanes are known to the art and to the literature and are commercially available and generally have a solid content of from about 20% to about 50% by weight, and desirably from about 25% to about 40% by weight in water.

The polysiloxanes of the present invention are substantially free of amine end groups. That is, generally less than about 10% by weight, desirably less than about 5% by weight, and preferably less than about 2% or about 1% by weight of the total weight of all polysiloxane polymers have an amine group thereon. It is most preferred that the polysiloxane polymers have no amine end group thereon. The total amount of the at least one polysiloxane per se, that is the total polymer(s) itself (100% solids and no water), based upon the total weight of all of the one or more polysiloxanes and all of the one or more polyurethanes per se, that is the total polyurethane polymer(s) (100% solids and no water), is generally from about 50% or about 53% to about 85% by weight, desirably from about 55% to about 80% by weight, and preferably from about 60% to about 75% by weight.

The various one or more polyurethanes preferably in the form of an aqueous dispersion provide structural integrity and durability with regard to weather elements such as wind, rain, sleet, and snow as well as durability with regard to extreme cold and hot temperatures. Such polyurethanes are commercially available and are derived from one or more polyisocyanates and one or more hydroxyl terminated intermediates such as polycarbonate intermediates, polyester intermediates, or polyether intermediates, or combinations thereof, with polycarbonate intermediates being preferred.

The polycarbonates, also referred to as dimer diol carbonates, are known to the art and to the literature and are linked together by carbonate groups, i.e.:

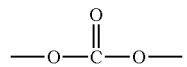

and contain one or more hydrocarbon groups having from about 1 to about 20 carbon atoms, with Bisphenol A being a very common and desired group. Desirably the polycarbonate is prepared from one or more aromatic diols such as bisphenol A, tetrabromo bisphenol A, tetramethyl bisphenol A, 1,1-bis(4-hydroxyphenyl)-1-phenylethane, 3,3-bis(para-hydroxyphenyl) phthalide, or bishydroxyphenylfluorene. The polycarbonates can be prepared from raw materials by any of several known processes such as interfacial, solution or melt processes. As is well known, suitable chain terminators and/or branching agents can be employed to obtain the desired molecular weights and branching degrees. The polycarbonate can be derived from two or more different aromatic diols, or an aromatic diol and a glycol, or a hydroxyl- or acid-terminated polyester, or a dibasic acid in the event a polycarbonate copolymer or heteropolymer is desired rather than a homopolymer.

The polyether intermediates are well known to the art and to the literature and generally have the repeat unit —R—O— wherein R is an alkylene group having from 1 to 6 carbon atoms with 2 or 3 carbon atoms, that is ethylene or propylene being preferred. Examples of water-borne polyurethane dispersions and processes for the preparation thereof are known to the art and to the literature, and the same are described in U.S. Pat. Nos. 5,312,865; 5,555,686; 5,696,291; 4,876,302; and 4,567,228, hereby fully incorporated by reference. Generally, hydrophilic polyether urethanes can be prepared using a polyether polyol having at least two, preferably three, hydroxyl groups, and a number average molecular weight in the range of from 2,000 to about 20,000, desirably about 2,000 to about 5,000, and preferably about 4,000 to about 5,000, and having random ethylene oxide units in a mole ratio of ethylene oxide (EO) to higher alkylene oxide of 1:1 to 4:1. The alkylene oxide can be selected from propylene oxide (PO), butylene oxide, pentylene oxide, hexylene oxide, trimethylene oxide, tetramethylene oxide, and mixtures thereof. The hydrophilic polyol is preferably a polyoxyethylene-propylene polyol comprising, for example, about 50% to about 70% EO and about 30% to about 50% PO. A particularly preferred polyether triol is one comprising approximately 68% EO and approximately 32% PO. Alternate ratios of EO:PO can be used in preparing the hydrophilic polyol provided that the hydrophilicity of the resulting polyol is not significantly adversely affected. These ratios can be determined by routine testing.

The various hydroxyl terminated polyesters include the linkage of the formula:

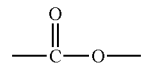

are generally made by the reaction of a dicarboxylic acid or an anhydride thereof having from about 2 to about 10 or about 20 carbon atoms with a diol having from about 2 to about 20 carbon atoms, with from about 2 to about 6 or about 8 carbon atoms being preferred. Examples of dicarboxylic acids and anhydrides include maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Examples of diols include various alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcyclohexane), 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol, polybutylene glycol, caprolactone diol, dimerate diol, hydroxylated bisphenols, halogenated diols, and the like, and mixtures thereof. Preferred diols generally include ethylene glycol, propylene glycol, butylene glycol, and hexane diol. Such polyester polyols are well known to the art and to the literature.

The hydroxyl terminated polyurethane intermediates of the present invention can also contain other hydrophilic groups in order to improve the dispersion of the polyurethane in water. Such hydrophilic groups are generally pendant from the backbone chain and include hydroxyl groups, carboxyl groups, and the like and can be crosslinked and result in cure of the urethane. Examples of hydroxyl groups are well known and include the glycols set forth hereinabove with regard to the formation of the polyester intermediate which are hereby fully incorporated by reference. Examples of carboxyl groups are also known to the art and to the literature and can include hydroxy-carboxylic acids having the general formula $(HO)_xQ(COOH)_y$, wherein Q is a straight or branched hydrocarbon radical containing 1 to 12 carbon atoms, and x and y, independently, are 1 to 3. Examples of such hydroxy-carboxylic acids include, but are not limited to, citric acid, dimethylolpropanoic acid (DMPA), dimethylol butanoic acid (DMBA), glycolic acid, lactic acid, malic acid, dihydroxymalic acid, dihydroxytartaric acid, and the like, and mixtures thereof.

The various isocyanates that are reacted with the one or more hydroxyl terminated intermediates are preferably an aliphatic or a cycloaliphatic diisocyanate to impart good weatherability to the polyurethane. Examples of such suitable diisocyanates having from 4 to about 20 carbon atoms include dicyclohexylmethane 4,4'-diisocyanate (H12MDI) 3,5,5-trimethyl-1-isocyanato-3-isocyanatomethylcyclohexane (isophorone diisocyanate) or IPDI), tetramethylene diisocyanate, 1,3-bis(isocyanatomethyl) cyclohexane, hexamethylene diisocyanate (HDI), and dodecamethylene diisocyanate. Of course, if a tri- or a tetra-isocyanate is utilized, it will result in crosslinking of the polyurethane.

The formation of the polyurethanes utilized in the present invention are well known to the art and to the literature and are commercially available as is the preparation thereof. Thus, reaction is usually carried out in an organic solvent such as methyl ethyl ketone, or n-methyl pyrrolidone, and the like. Neutralizing agents are desirably added to render the polyurethane more water compatible. Neutralizing agents include amines such as N-methyl morpholine, triethylamine, dimethyl ethanolamine, methyl diethanolamine, morpholine dimethyl isopropanolamine, 2-amino-2-methyl-1-propanol, and the like, and mixtures thereof. Chain extension is usually desired and while various diols can be utilized, diamines having a total of from about 2 to about 20 carbon atoms are desired. Examples include ethylendiamine, 1,6-diaminohexane, piperazine, tris(2-aminoethyl)amine and amine tertinated polyethers, and mixtures thereof, and the like. Water is generally added after neutralization. Subsequently, the organic solvent can be removed through various known techniques such as evaporation, utilization of extraction techniques, and the like with the result being a high molecular weight aqueous polyurethane.

The number average molecular weight of polyurethanes of the present invention generally range from about 50,000 to about 500,000 with about 150,000 to about 400,000 being preferred. The amount of urethane solids in water is generally from about 20% to about 50% by weight and desirably from about 25% to about 40% by weight. The polycarbonate based polyurethanes are preferred.

The amount of the one or more polyurethanes, per se, that is the total polymer(s) (100% solids and no water) utilized in the aqueous dispersion compositions of the present invention is generally from about 15% to about 50% by weight, desirably from about 20% to about 45% by weight, and preferably from about 25% to about 40% by weight based upon the total weight of all of the polymers, that is the one or more polysiloxane solids, and the one or more polyurethanes.

While various additives may contain some organic solvent, the total amount of any one or more organic solvents is low, that is generally less than about 7% by weight, desirably less than about 5% by weight and preferably less than about 2% by weight based upon the total weight of the aqueous dispersion composition including the various additives therein. The aqueous dispersion compositions of the present invention are thus environmentally friendly and yet provide low noise and low coefficients of friction when applied to a rubber or polymer substrate.

The polyurethanes of the present invention can be crosslinked after the aqueous dispersion composition has been applied to a substrate. By crosslinking or curing it is meant that an individual polyurethane chain is chemically bound to at least one, preferably at least two other different polyurethane chains at a point other than their terminus. A preferred crosslinking mechanism of the present invention is through one or more pendant carboxylic acid groups of the polyurethane. Suitable crosslinking agents include various carbodiimides that are known to the art and to the literature. Alternatively, various aziridines can be utilized which have two or more aziridine groups thereon such as trimethylolpropane-tris-(B—(N-Aziridinyl)Propionate), and Pentaerythritol-tris-(B—(N-Aziridinyl)Propionate). Carbodiimide and polyaziridine crosslinking agents are desired and are curable at temperatures from about 50° C. to about 200° C. and desirably from about 80° C. to about 190° C. in relatively short periods of time as from about 2 to about 30 minutes. Naturally, the crosslinking reaction should not be carried out until the aqueous dispersion composition has been applied to an end substrate. The amount of crosslinker generally ranges from about 0.5% to about 10% and desirably from about 1% to about 5% by weight based upon the total weight of the polysiloxane-polyurethane dispersion composition.

An important aspect of the present invention is the utilization of one or more polyolefins and preferably polyethylenes such as powdered crystalline high temperature resistant polyethylenes since they lower both the dry and wet noise level when applied to a vehicle seal such as an automobile weatherstrip. Such polyethylenes are commercially available and thus known to the art and to the literature. The amount of the polyolefins such as the noted polyethylene generally ranges from about 5 or about 8 to about 35 parts by weight and desirably from about 10 or about 15 to about 25 or about 30 parts by weight per 100 parts by weight of the one or more polysiloxanes per se and one or more polyurethanes, per se, that is free of water and solvents. The weight average molecular weight of the preferred polyethylene is generally very high and ranges from about 2 million to about 5 million and desirably from about 3 million to about 4 million and thus can be classified as an ultra high molecular weight polyethylene. The size of the polyethylene powder can vary with a mean or average particle diameter of from about 20 to about 50 microns.

Various additives such as fillers, ceramic spheres, gloss control agents, pigments, rheology modifiers, wetting agents, and the like can be used to impart various properties to the aqueous dispersion coating composition and/or the cured coating thereof.

Fillers are utilized to lower costs and often to lower COF and noise. Desirably the fillers are various polymers such as nylon, polytetrafluoroethylene, polyolefins, and silicone rubber powder. These fillers aid in reducing the coefficient of friction of the dried aqueous dispersion coatings of the present invention. However, with regard to noise reduction, they generally only show improved results with regard to dry noise properties.

Halogenated polymers are avoided because they have generally been found not to reduce noise levels, either wet or dry, and are usually expensive. Such polymers include polyvinyl chloride, and various fluorocarbon polymer such as polytetrafluoroethylene, polyvinyl fluoride, polyvinylidene fluoride, and polychlorotrifluoroethylene. If utilized, the amounts thereof are small such as generally less than about 10 parts by weight, desirably less than about 5 parts by weight, preferably less than 2 or 1 part by weight, and preferably nil, that is no parts by weight per 100 total parts by weight of the one or more polysiloxanes per se and the one or more polyurethanes per se.

Another class of compounds that are avoided are various tackifiers since they generally destroy low coefficient of friction values, are sticky and do not give quick release with respect to metals, plastics, and the like, and pick up dust and dirt. Examples of avoided tackifiers include various aromatic and aliphatic hydrocarbon resins, various rosins such as tall oil rosins and esters of rosins, pine tar, various phenolic resins, various alkylphenol formaldehydes, and the like. Any amount thereof utilized is very small such as generally less than about 10 or less than about 5 parts by weight, desirably less than about 2 parts by weight and preferably 1 part or less, or nil, that is no parts by weight based on 100 total parts by weight of the one or more polysiloxanes per se, and the one or more polyurethanes per se.

Another class of fillers includes ceramic spheres which are generally utilized as an extender and the same are known to the art and to the literature. Suitable spheres include ceramic beads that have an average diameter of from about 1 to about 12 microns. The amount thereof is generally from about 10 or about 20 to about 35 or about 40 parts by weight per 100 parts by weight of said one or more polysiloxanes per se and said one or more polyurethanes per se.

Various gloss control agents in amounts from about 2 or about 4 parts to about 7 or about 9 parts by weight per 100 parts by weight of the one or more polysiloxanes per se and the one or more polyurethanes per se can be utilized to lower the gloss of the cured coating. A suitable gloss control agent are known to the art and to the literature such as various synthetic wax coated silicas.

It is often desired to use various pigments so that the applied coating can generally match the color of the polymer substrate. Since weatherstrip seals are often black, various black pigment dispersions can be utilized the majority of which are various carbon blacks that are well known to the art and to the literature. The amount of such pigments can vary as from about 0.1 to about 5.0 parts by weight per 100 parts by weight of the one or more polysiloxanes per se and the one or more polyurethanes per se.

In order to keep the aqueous dispersion coating composition from dripping, pooling, sagging or running when applied to a substrate and also to keep the polymer particles dispersed in water, a rheology modifier or thickener is often utilized. Numerous types of commercially available thickeners can be utilized in amounts of from about 0.5 or 1.5 to about 2.5 or about 3 parts by weight per 100 parts by weight of the one or more polysiloxanes per se and the one or more polyurethanes per se. Thickeners include various rheology modifiers such as a urethane based associative thickener.

Rheological additives also include numerous wetting agents with fluorinated anionic surfactants generally being desired. Depending upon the specific formulations of the aqueous dispersion coating composition, the amounts can vary greatly such as from about 0.05 to about 0.5 parts by weight per 100 parts by weight of the one or more polysiloxanes per se and the one or more polyurethanes, per se.

The aqueous dispersion composition of the present invention is made by adding the polysiloxane aqueous dispersion as well as the polyurethane aqueous dispersion together and mixing. Subsequently, the gloss control agent can be added and blended under shear. Then the remaining components can be added either separately or all together, mixed and stored until needed. Before application to a substrate, in any conventional manner such as dipping or brushing, with spraying being preferred, a crosslinking agent is optionally added in an amount of from about 1% to about 5% by weight based upon the total weight of the aqueous dispersion coating.

The substrates can be any rubber or polymer to which a low coefficient of friction coating is applied, and/or to a substrate that has an end use where it is desired to emit a low level of noise upon contact with an article such as generally about 42 dBA or less, desirably about 40 dBA or less, and preferably about 38 dBA or less, and more preferably 36 dBA or less. In addition to the present invention obtaining good low noise values, with regard to both wet and dry conditions, an important aspect is that good stability values are obtained. That is, when the formulations of the present invention are applied to a weatherstrip substrate, the coefficient of friction with regard to time does not increase but surprisingly and unexpectedly decreases. Initial static coefficient of friction values of the compositions of the present invention according to ASTM Test D-1894-95 are generally very low such as about 0.40 or less, desirably about 0.35 or less, and preferably 0.32 or less. Such values actually decrease with time and an important aspect of the present invention is that upon aging the composition of the present invention have a lower static coefficient of friction after 12 weeks, 16 weeks, 20 weeks, 28 weeks, and even after 40 weeks which is lower than the initial value. This is very unusual inasmuch as heretofore, prior art coatings would invariably increase. Similarly, the kinetic coefficient of friction values dropped with time and took several months according to ASTM Test D-1894-95 before they rose to the initial value. Thus, both the static test and the kinetic test show that coefficient of friction values are stabilized with time whereas with prior art coats, increases with time were always generally obtained. The various substrates can be fully coated upon all surfaces thereof but generally are only partially coated as upon a surface which would bear against painted metal or plastic and/or require a low coefficient of friction engagement. Substrates include various rubbers, i.e. elastomers, such as, but not limited to, those derived from natural rubber, butadiene, isoprene, butadiene and styrene, as well as ethylene-propylene-diene rubber. Polymer substrates include, but are not limited to, the various acrylics, various vinyl or vinylidene polymers such as polyvinyl chloride and polystyrene, various types of polyamides, various types of polyesters, various types of polyurethanes, various types of polyolefins, various types of thermoplastic olefins, and various types of thermoplastic elastomers or vulcanizates such as thermoplastic polyurethanes. A preferred end use of a composition is to coat a vehicle weatherstrip to lessen the noise generally created by vibration thereof as against a metal or plastic article or part. Vehicles include various types of trucks such as pickup trucks, vans, sport utility vehicles, automobiles, and the like. Weatherstrips include any weatherstrips used on a vehicle and especially weatherstrips for use on doors, windows, hoods, and trunk lid seals.

Referring to the drawing, weatherstrip 10 generally made from EPDM contains body fastening portion 12 which is affixed to a vehicle part such as door flange. EPDM sponge bulb 16 can engage or contact a body portion of a vehicle such as a door frame to create a weatherseal therewith. The aqueous coating composition 18 of the present invention is applied to the sponge bulb 16 which will contact the body of the vehicle.

The invention will be better understood by reference to the following examples which serve to illustrate, but not to limit the present invention.

The aqueous dispersion coatings of the present invention are environmentally friendly inasmuch as they are water based compositions and contain very low amounts of solvents, if any. They exhibit low term coefficient of friction values as well as low noise values when utilized as a weatherstrip on a vehicle.

The coated rubber weatherstrip was tested with accordance with a General Motors test, i.e. GM9842P Rev A. The test description is duplicated as follows:

GM Engineering Standards, Test Method, GM9842P, Rev A.

1. Scope

This specification describes a test to evaluate and rank the acoustic output of 2 similar or dissimilar materials in dynamic contact.

Note: Nothing in the specification, however, supersedes applicable laws and regulations unless a specific exemption has been obtained.

Note: In the event of a conflict between the English and the domestic language, the English language shall take precedence.

2. References

Note: Only the latest approved standards are applicable unless otherwise specified.

2.1 Normative.

Not Applicable.

2.2 GM.

GM9840P GM9842P

3 Test Equipment 3.1 Sound Isolation. A semi-anechoic chamber capable of reducing the interior ambient sound pressure to a level of 30 dB(A) maximum (vibration system operating with the fixture). Additionally, the chamber shall permit the conditioning of the air to the specified temperature and humidity limits (Section 5.1).

3.2 Vibration System. A vibration system capable of the sine and random specification (Section 5.3). The vibration system chosen will normally be of the electro-dynamic type but may include other types capable of low noise generation so as to minimize the interference of acoustic measurements of the parts under test.

3.3 Measurement System. A calibrated ANSI Type 1 microphone and sound data acquisition system (SDAS) capable to yielding A weighted stable average Sound Pressure levels (SPL) and ⅓ octave band frequency domain charts across the 20 Hz to 20 kHz frequency range. The system should additionally provide the capability for recording the sound output of the parts under test to a digital file for audio playback at later date.

3.4 Fixtures. Fixturing systems should enable close approximation of materials, deflection and fit of the vehicle components.

4 Test Material 4.1 Test Specimens. Three specimens must be tested. Specimens shall be individual pieces or cut sections of rubber, plastic, or substrate 150 mm in length or mutually acceptable and appropriate to component use. Mating surface should, where possible, approximate the profile and surface in actual use to accommodate the probable displacement or interference force of the specimens.

5 Test Method 5.1 Standard Test Conditions. Unless otherwise specified, the standard test environment shall be 21±1° C. and 75±5% relative humidity. Unless otherwise specified, the standard test surface shall be DuPont RK8010A Clearcoat. The compression height must be specified at the time of part submittal and must be derived from the nominal value on the part drawing.

5.2 Calibration and Ambient Noise Record. Prior to any measurements, the microphone and sound data acquisition system must be calibrated with an NIST traceable 1 kHz tone calibrator. The calibration tone points of 94 dB amplitude and 104 dB amplitude shall be used. These results must be entered on the report form. Adjust the microphone to the test interface distance of 150 mm. This distance shall remain constant for the duration of these tests and must be documented in the test report. Prior to test sample contact, start the vibration system with the specified sine or random vibration profile and record the ambient noise for 10 seconds. This value must not exceed 30 dB(A) and must be documented on the report form. This must be performed prior to each test session, or where vibration parameters are changed. The ambient noise spectrum shall become part of the report.

5.3 Vibration Profiles. The following tables (Tables 1 and 2) specify both sine and random vibration profiles for sample testing.

TABLE 1

| Random Vibration Profile | | |
| --- | --- | --- |
| Frequency | PSD (g²/Hz) | Displacement (pk-pk) |
| 5 Hz | .0065 | .308 inches (7.82 mm) |
| 12.5 Hz | .063 | .242 inches (6.14 mm) |
| 20 Hz | .0995 | .151 inches (3.83 mm) |
| 32.5 Hz | .1480 | .089 inches (2.26 mm) |
| 50 Hz | .036 | .023 inches (0.58 mm) |

PSD (Power Spectral Density
Total G(RMS) = 1.945

TABLE 2

| Sine Vibration Profiles | | |
| --- | --- | --- |
| Frequency | Displacement (pk-pk) | Substrate |
| 9 Hz | 0.2 inches (5 mm) | Elastomer (<65 Shore A) |
| 9 Hz | 0.04 inches (1 mm) | Plastic (≧65 Shore A) |

Each of the two above sine profiles is specific to the hardness of the compound formulation.

5.4 Sample Preparation. All surfaces shall be clean and free of dirt or oils. All test samples or parts shall be cleaned with water, followed by drying at ambient temperature for a 12 hour period. Glass, paint or metal surfaces shall be cleaned with isopropyl alcohol prior to test unless otherwise agreed upon.

5.5 Dry Interface Test. Start the sound analysis system and the vibration mechanism and record output for 10 seconds as a digital frequency domain file. Repeat twice for a minimum of three readings. Interval between readings shall be 2 minutes. Reading shall be taken at initiation of vibration, at 2 minutes from start, and at 4 minutes from start. If noise data is unstable, the test duration may be extended. Repeat for a total of three part samples, with three measurements for each sample.

5.6 Wet Interface Test. With pipette, add 2±0.25 mL of distilled water to the interface. Record output as described in Section 5.5.

(Option) Long Term Durability Test. Optionally, the test sample may be permitted to vibrate in the dry interface mode for an extended number of cycles or period of time to assess the long-term acoustic properties.

6 Evaluation and Rating 6.1 The results shall be reported as calculated values from the mean of 3 (initial, two minutes, four minute) stable average amplitude readings in dB(A) (relative to 20 micropascal base).

6.2 The test in GM9842P result in a total of twelve values (four random-dry, four random-wet, four sine-dry and four sine-wet) for each of the three submitted weatherstrip specimens.

9 Safety

This method may involve hazardous materials, operations and equipment. This method does not propose to address all the safety problems associated with its use. It is the responsibility of user of this method to establish appropriate safety and health practices and determine the applicability of regulatory limitations prior to use.

9 Coding System

This test procedure shall be called up in other documents, drawings, VTS, CTS, etc. as follows: "Test to GM9842P"

10 Release and Revisions 10.1 Release. This standard was developed with the cooperation of Custom Acoustic Research and Environmental Screening Test Laboratories (ESTL). The standard was originated by the Weatherstrip Specialist Team in December 1997 and first published in September 1998.

| | TEST REPORTING MATRIX | | | |
|---|---|---|---|---|
| | CONDITIONS | | | |
| | Random/Dry | Random/Wet | Sine/Dry | Sine/Wet |
| | Sample #1 | | | |
| READINGS | Initial Reading | Initial Reading | Initial Reading | Initial Reading |
| | 2-min Reading | 2-min Reading | 2-min Reading | 2-min Reading |
| | 4-min Reading | 4-min Reading | 4-min Reading | 4-min Reading |
| VALUES | Mean | Mean | Mean | Mean |
| | Sample #2 | | | |
| READINGS | Initial Reading | Initial Reading | Initial Reading | Initial Reading |
| | 2-min Reading | 2-min Reading | 2-min Reading | 2-min Reading |
| | 4-min Reading | 4-min Reading | 4-min Reading | 4-min Reading |
| VALUES | Mean | Mean | Mean | Mean |
| | Sample #3 | | | |
| READINGS | Initial Reading | Initial Reading | Initial Reading | Initial Reading |
| | 2-min Reading | 2-min Reading | 2-min Reading | 2-min Reading |
| | 4-min Reading | 4-min Reading | 4-min Reading | 4-min Reading |
| VALUES | Mean | Mean | Mean | Mean |

Any mean value exceeding 40 dBA will be considered unacceptable.

6.3 Values greater than 40 dB(A) will be considered unacceptable.

7 Report

The following information must be reported: The test lab must provide frequency domain spectra with a minimum resolution of ⅓ octabe across the frequency span. The finished report shall further document the test sample environment including the ambient noise measurement, temperature and relative humidity conditions, and a copy of the NIST calibration certificate. Parameters applied to the sample, such as counter surface, vibration frequency, stroke length, degree of deflection or normal force load, duration of test, and condition of the interface between the sample and mating surface (dry, wet, etc.) must be reported.

8 Approved Sources

Engineering qualification of an approved source is required for this specification. Only sources listed in the GM Corporate Materials File under this specification number have been qualified by engineering as meeting the requirements of this specification. Sources are available through the on-line MATSPC System.

10.2 Revisions.

| Rev. | Date | Description/Reason | Originating Organization/ Committee |
|---|---|---|---|
| A | December 1998 | Changed specification number form GM9840P to GM9842P. Number incorrectly assigned. Moved from General Book to Procedures Book | Weatherstrip Specialist Team |
| B | January 2002 | Changed format; changed Background limit to 30 dB(A); added standard test conditions; added seal deflection requirements; added test reporting matrix | Weatherstrip Specialist Team |

EXAMPLE A

Formulation A relates to an aqueous dispersion coating of the present invention which produces low wet and dry noise levels when applied to an EPDM weatherstrip substrate. The weatherstrip utilized in all of the Examples is described as a typical sculptured sponge bulb primary door seal which contains a typical EPDM composition as shown in the drawing.

FORMULATION A

| | % Solids | Total Parts by Weight |
|---|---|---|
| Aqueous Polyurethane - polycarbonate based | 39% | 17.21 |
| Ultra High Molecular Weight Polyethylene Powder (filler) | 100% | 4.00 |
| Ceramic Beads (fillers) average diameter 1-12 microns | 100% | 6.40 |
| Synthetic Wax Coated Silica (gloss control agent) | 100% | 1.14 |
| Silicone Resin - aqueous dispersion | 35% | 40.15 |
| Pigment - carbon black dispersion | 30% | 1.93 |
| Water (DI) | 0% | 26.86 |
| Rheological Additives | 21% | 2.31 |
| Total Weight | | 100.00 |

The polyurethane dispersion and the polysiloxane or silicone resin dispersion were added to a vessel and mixed along with approximately one half by weight of the wetting agent for approximately 15 minutes. The silica gloss control agent was then added and mixed under moderate shear using an air-powered Hochmeyer blade for approximately 15 minutes. Subsequently, the remaining ingredients were added in any order and blended while mixing. Once all the various components were added, the mixture was further mixed for approximately 20 minutes, then filtered and packaged for storage. Prior to use, approximately 3% by weight of a carbodiimide crosslinking agent was added with mixing. Crosslinking agents were also utilized in all of the following examples. The mixed coating composition was then applied using a Turbo spray or a HVLP spray gun to the EPDM substrate. Typical application viscosities ranged between 20 to about 50 seconds on a Zahn #3 cup. The total solids content of the coating composition generally ranged from about 30% to about 35% by weight and the dry coating or film thickness was from about 0.2 to about 0.6 mil.

The coated substrate was then tested in accordance with GM Test Method GM9842P, Rev A. The following data was obtained as set forth in Table 1.

TABLE 1

| Composition | (dBA) Random Dry | (dBA) Random Wet | (dBA) Sine Dry | (dBA) Sine Wet |
|---|---|---|---|---|
| Formulation A | 35 | 38 | 26 | 27 |

As apparent from the above data, good low dBA values were obtained with regard to random wet and dry test and very good data was obtained to the wet and dry sine test.

EXAMPLES B, C, D, AND E

The formulation for additional aqueous dispersion coatings of the present invention are set forth as follows:

FORMULATIONS B, C, D, AND E

| | | FORMULATIONS (total parts by weight) | | | |
|---|---|---|---|---|---|
| Ingredient | % Solids | B | C | D | E |
| Aqueous Polyurethane - polycarbonate based | 39% | 16.64 | 16.64 | 16.64 | 16.64 |
| Ultra High Molecular Weight Polyethylene Powder (filler) | 100% | 3.87 | 3.87 | 3.87 | 3.87 |
| Ceramic Beads (fillers) average diameter 1-12 microns | 100% | 6.19 | 6.19 | 6.19 | 6.19 |
| Synthetic Wax Coated Silica (gloss control agent) | 100% | 1.10 | 1.10 | 1.10 | 1.10 |
| Silicone Resin - aqueous dispersion (% solids) | | (35%) 38.82 | (35%) 38.82 | (50%) 27.18 | (40%) 33.98 |
| Pigment - carbon black dispersion | 30% | 1.87 | 1.87 | 1.87 | 1.87 |
| Water (DI) | 0% | 29.67 | 29.67 | 41.31 | 34.51 |
| Rheological Additives | 21% | 1.84 | 1.84 | 1.84 | 1.84 |

Formulations B through E were prepared in a manner as set forth with regard to Example A and tested with respect to the same GM test on the same type of weatherstrip substrate. The results are set forth in Table 2.

TABLE 2

| Formulation | (dBA) Dry, Random | (dBA) Wet, Random | (dBA) Dry, Sine | (dBA) Wet, Sine |
|---|---|---|---|---|
| B | 33.0 | 36.6 | 25.4 | 27.1 |
| C | 33.7 | 36.3 | 27.2 | 27.3 |
| D | 31.4 | 35.0 | 26.1 | 27.8 |
| E | 33.3 | 37.8 | 25.6 | 26.8 |

As apparent from the above, very good low dBA readings were obtained with regard to both the wet and dry sine test as well as the wet and dry random test.

By way of comparison with respect to Tables 1 and 2, Table 3 sets forth data obtained utilizing the same GM test and EPDM weatherstrip substrate as set forth above. Lord Corporation Products #1, #2, and #3 were utilized as controls and were tested with regard to noise levels.

TABLE 3

| Coating | (dBA) Random Dry | (dBA) Random Wet | (dBA) Sine Dry | (dBA) Sine Wet |
|---|---|---|---|---|
| Lord Product #1 | 50 | 65 | 41 | 63 |
| Lord Product #2 | 34 | 55 | 28 | 50 |
| Lord Product #3 | 30 | 62 | 25 | 61 |

As apparent from Table 3, very high dBA values were obtained with regard to both random wet as well as the wet sine tests. In comparison, the data set forth above with regard to Formulations A through E unexpectedly achieved much lower values, that were in some cases greater than 50% lower.

EXAMPLES F AND G

Formulations F and G are similar to Formula A except that generally a different polysiloxane was utilized in Formulation F as well as in Formulation G and the Formulation G additionally contained about 3 parts by weight of polyethylene.

FORMULATION F and G

| Ingredient | Percent Solids | Formulation F Total Parts by Weight | Formulation G Total Parts by Weight |
|---|---|---|---|
| Aqueous Polyurethane - polycarbonate based | 39% | 16.64 | 13.21 |
| Ultra High Molecular Weight Polyethylene Powder (filler) | 100% | 3.87 | 2.93 |
| Ceramic Beads (fillers) average diameter 1-12 microns | 100% | 6.19 | 6.30 |
| Synthetic Wax Coated Silica (gloss control agent) | 100% | 1.10 | — |
| Silicone Resin - aqueous dispersion | 50% | 27.18 | — |
|  | 40% | — | 39.69 |
| Pigment - carbon black dispersion | 30% | 1.87 | 1.90 |
| Water (DI) | 0% | 41.31 | 25.55 |
| Rheological Additives | 21% | 1.84 | 1.87 |
| m-pyrrolidone | 0% | — | 8.55 |

Three commercial products were also tested at the same time, that is Competitive Products #1, and #2, as well as Lord Product #3.

TABLE 4

| Coating | (dBA) Dry Random | (dBA) Wet Random | (dBA) Dry Sine | (dBA) Wet Sine |
|---|---|---|---|---|
| Formulation F | 30.4 | 30.6 | 24.9 | 24.2 |
| Formulation G | 31.5 | 35.1 | 24.2 | 26.7 |
| Competitive Product #1 | 34.1 | 42.7 | 27.0 | 40.6 |
| Competitive Product #2 | 37.8 | 47.1 | 29.2 | 40.4 |
| Lord Product #3 | 27.6 | 57.2 | 23.5 | 57.1 |

As apparent from Table 4, Formulations F and G of the present invention gave excellent low noise values even with regard to the wet random values and wet sine test values whereas the commercial products gave very high noise values.

EXAMPLES H, I, J, AND K

Further formulations with regard to coatings for weatherstrips are set forth as follows.

Formulations H, I, J, and K

| | | % Silicone resin | | | |
|---|---|---|---|---|---|
| | % Solids | 47% H | 57% I | 66% J | 75% K |
| Aqueous Polyurethane - polycarbonate based | 39% | 28.21 | 23.21 | 18.21 | 13.21 |
| Ultra High Molecular Weight Polyethylene Powder (filler) | 100% | 2.93 | 2.93 | 2.93 | 2.93 |
| Ceramic Beads (fillers) average diameter 1-12 microns | 100% | 6.30 | 6.30 | 6.30 | 6.30 |
| Silicone Resin - aqueous dispersion | 40% | 24.69 | 29.69 | 34.69 | 39.69 |
| Pigment - carbon black dispersion | 30% | 1.90 | 1.90 | 1.90 | 1.90 |
| Water (DI) | 0% | 25.55 | 25.55 | 25.55 | 25.55 |
| m-pyrrolidone | 0% | 8.55 | 8.55 | 8.55 | 8.55 |
| Rheological Additives | 21% | 1.87 | 1.87 | 1.87 | 1.87 |
| Total | | 100.00 | 100.00 | 100.00 | 100.00 |

Formulations H, I, J, and K were prepared in a manner as set forth with regard to Example A and tested with respect to the same GM test on the same types of substrates as set forth in Example A. The noise results are set forth in Table 5.

TABLE 5

| Noise (dBA) | FORMULATIONS | | | |
|---|---|---|---|---|
|  | H | I | J | K |
| Random Wet | 40.7 | 36.7 | 36.6 | 35.9 |
| Sine Wet | 26.8 | 25.9 | 26.7 | 27.0 |
| Random Dry | 34.1 | 33.1 | 31.7 | 32.3 |
| Sine Dry | 24.8 | 25.2 | 24.6 | 24.8 |

As apparent from Table 5, once again very low dBA noise levels were obtained in the various tests. Moreover, with regard to the wet tests, and especially the random wet test, with the exception of Formulation H, values below 38 dBA were readily obtained. Example H demonstrates that generally high amounts of silicone resin, i.e. in excess of 50% by weight, and in combination with about 3 wt % of PE powder are generally desired in order to obtain good random wet properties.

EXAMPLES L, M, AND N

The aqueous dispersion compositions of the present invention were also tested with regard to long term retention of static and dynamic coefficient of friction properties. Formulations with regard to such aqueous dispersion compositions are set forth in Formulations L, M, and N wherein different fillers have been utilized and yet good low dBA were obtained as well as good stability values.

| Formulations L, M, and N | | | | |
|---|---|---|---|---|
|  | % | FORMULATION | | |
|  | Solids | L | M | N |
| Aqueous Polyurethane - polycarbonate based | 39% | 28.68 | 28.68 | 17.21 |
| Ultra High Molecular Weight Polyethylene Powder (filler) | 100% | 2.98 | 2.98 | 2.98 |
| Ceramic Beads (fillers) average diameter 1-12 microns | 100% | 6.40 | 6.40 | 6.40 |
| Fluorinated Polymer Dispersion | 50% | — | 2.98 | — |
| Silicone Resin - aqueous dispersion | 35% | 28.68 | 28.68 | 40.15 |
| Pigment - carbon black dispersion | 30% | 1.93 | 1.93 | 1.93 |
| Water (DI) | 0% | 30.69 | 30.69 | 30.69 |
| Rheological Additives | 21% | 2.31 | 2.31 | 2.31 |
| Total |  | 101.67 | 104.65 | 101.67 |

After the above ingredients were mixed to form the noted formulations and just prior to application to an EPDM weatherstrip substrate in accordance with GM 9842P, Rev. A, 3% weight based upon the total weight of the formulation of the above-noted crosslinking agent is added and mixed.

Test values with regard to noise level, gloss, and coefficient of friction are set forth in Table 6.

TABLE 6

|  | FORMULATION | | |
|---|---|---|---|
|  | L | M | N |
| Dry Sine (dBA) | 24.4 | 23.9 | 24.7 |
| Wet Sine (dBA) | 27.8 | 27.4 | 28.4 |
| Dry Random (dBA) | 30.7 | 28.6 | 32.9 |
| Wet Random (dBA) | 35.0 | 34.6 | 35.4 |

As apparent from the data, once again excellent low noise dBA were obtained including the wet random test.

Formulations L and N were tested in accordance with ASTM Test D1894-95 with regard to static coefficient of friction as a function of time. The results were as follows.

TABLE 7

|  | Formulation L | | Formulation N | |
|---|---|---|---|---|
| Time/Weeks | Static | Kinetic | Static | Kinetic |
| 0 | 0.325 | 0.236 | 0.298 | 0.216 |
| 4 | 0.243 | 0.156 | 0.202 | 0.145 |
| 8 | 0.193 | 0.126 | 0.221 | 0.134 |
| 12 | 0.212 | 0.170 | 0.179 | 0.152 |
| 16 | 0.291 | 0.257 | 0.267 | 0.217 |
| 20 | 0.279 | 0.228 | 0.229 | 0.182 |
| 28 | 0.266 | 0.244 | 0.244 | 0.200 |
| 40 | 0.330 | 0.269 | 0.248 | 0.227 |

As apparent from the above, the standard coefficient of friction with time at the various indicated week periods was always lower than the initial coefficient of friction. Consistent COF is important over time to maintain good ice release and low dirt pick-up on the door seal.

While in accordance with the patent statutes, the best mode and preferred embodiment have been set forth, the scope of the invention is not limited thereto, but rather by the scope of the attached claims.

What is claimed is:

1. An aqueous dispersion composition, comprising:

a polymer blend comprising a) an aqueous dispersion of at least one polysiloxane and b) an aqueous dispersion of at least one polyurethane, wherein the amount of said at least one polysiloxane polymer ranges from about 50% to about 85% by weight and the amount of said at least one polyurethane ranges from about 15% to about 50% by weight based upon the total solids weight of said at least one polysiloxane polymer and said at least one polyurethane polymer, said polyurethane derived from at least one aliphatic or cycloaliphatic diisocyanate; said polyurethane being heat curable; and c) a polyolefin in an amount of from about 5 parts by weight to about 35 parts by weight per 100 total parts by weight of said one or more polysiloxanes and said one or more polyurethanes;

said aqueous dispersion containing about 7% by weight or less of an organic solvent based upon the total weight of said dispersion composition;

said polymer blend containing less than about 10 parts by weight of a tackifier based upon 100 total parts by weight of said at least one polyurethane and said at least one polysiloxane; and said polymer blend containing less than about 10 parts by weight of a halogen containing polymer based upon 100 total parts by weight of said at least one polyurethane and said at least one polysiloxane.

2. An aqueous dispersion composition according to claim 1, wherein the amount of said polysiloxane from about 55% to about 80% by weight and wherein the amount of said polyurethane is from about 20% to about 45% by weight based upon the total weight of said at least one polysiloxane polymer and at least one polyurethane polymer.

3. An aqueous dispersion composition according to claim 2, wherein said polyolefin comprises a polyethylene in an amount of from about 10 parts by weight to about 30 parts by weight, and wherein said polyurethane is derived from a polyether intermediate.

4. An aqueous dispersion composition according to claim 3, wherein the weight average molecular weight of said polyethylene is from about 2 million to about 5 million; wherein the amount of said tackifier is less than about 5 parts by weight; and wherein the amount of said halogen containing polymer is less than about 5 parts by weight.

5. An aqueous dispersion composition according to claim 4, wherein said polysiloxane comprises poly(dimethylsiloxane), wherein the amount of any polysiloxane having an amine end group is about 10% by weight or less based upon the total weight of all polysiloxanes, wherein the amount of said polyethylene is from about 15 to about 25 parts by weight, wherein the amount of any organic solvent is about 5% by weight or less; wherein the amount of said tackifier is less than 1 part by weight; and wherein the amount of said halogenated polymer is less than 1 part by weight.

6. An aqueous dispersion composition according to claim 5, wherein the amount of said polysiloxane ranges from about 60% to about 75% by weight and wherein the amount of said polyurethane ranges from about 25% to about 40% by weight based upon the total weight of said at least one polysiloxane and said at least one polyurethane; and wherein said polyethylene has a weight average molecular weight of from about 3 million to about 4 million.

7. A polymer or rubber substrate at least partially coated with the dried aqueous composition of claim 1, and wherein the wet random noise level of said substrate according to GM test method GM9842P, Rev. A is about 42 dBA or less.

8. A polymer or rubber substrate at least partially coated with the dried aqueous composition of claim 3, and wherein said substrate is a rubber, an acrylate, a vinyl or vinylidene polymer, a polyamide, a polyester, a polyurethane, a polyolefin, a thermoplastic olefin, or a thermoplastic vulcanizate, or combinations thereof; and wherein the wet random noise level of said substrate according to GM test method GM9842P, Rev. A is about 40 dBA or less.

9. A polymer or rubber substrate at least partially coated with the dried aqueous composition of claim 5, and wherein said substrate is a rubber, an acrylic, a vinyl or vinylidene polymer, a polyamide, a polyester, a polyurethane, a polyolefin, a thermoplastic olefin, or a thermoplastic vulcanizate, or combinations thereof and wherein the wet random noise level of said substrate according to GM test method GM9842P, Rev. A is about 38 dBA or less, and wherein said substrate according to ASTM D1894-95 has an initial static coefficient of friction value of about 0.40 or less.

10. A polymer or rubber substrate at least partially coated with the dried aqueous composition of claim 6, and wherein said substrate is an ethylene-propylene-diene rubber, a thermoplastic elastomer, or thermoplastic olefin, or combinations thereof and wherein said wet random noise level of said substrate according to GM test method GM9842P, Rev. A is about 36 dBA or less, and wherein said substrate according to ASTM D1894-95 has an initial static coefficient of friction value of about 0.32 or less.

11. A weatherstrip for a vehicle, said weatherstrip being at least partially coated with the dried, aqueous composition of claim 1, and wherein the wet random noise level of said substrate according to GM test method GM9842P, Rev. A is about 42 dBA or less.

12. A weatherstrip for a vehicle, said weatherstrip being at least partially coated with the dried, aqueous composition of claim 3, and wherein the wet random noise level of said substrate according to GM test method GM9842P, Rev. A is about 40 dBA or less.

13. A weatherstrip for a vehicle, said weatherstrip being at least partially coated with the dried, aqueous composition of claim 5, and wherein said weather strip comprises a rubber, an acrylate, a polyamide, a urethane, or combinations thereof, and wherein the wet random noise level of said substrate according to GM test method GM9842P, Rev. A is about 38 dBA or less.

14. A weatherstrip for a vehicle, said weatherstrip being at least partially coated with the dried, aqueous composition of claim 7, and wherein said weather strip comprises a rubber, an acrylic, a polyamide, a urethane, or combinations thereof, and wherein the wet random noise level of said substrate according to GM test method GM9842P, Rev. A is about 36 dBA or less.

15. The weatherstrip of claim 11, wherein said weatherstrip according to ASTM Test D-1894-95 has an initial static coefficient of friction value of about 0.40 or less.

16. The weatherstrip of claim 12, wherein said weatherstrip according to ASTM Test D-1894-95 has an initial static coefficient of friction value of about 0.35 or less.

17. The weatherstrip of claim 14, wherein said weatherstrip according to ASTM Test D-1894-95 has an initial static coefficient of friction value of about 0.32 or less and wherein the static coefficient of friction is maintained for at least about 40 weeks.

18. A low noise vehicle weatherstrip, comprising:
a weatherstrip substrate, said weatherstrip substrate having at least a surface thereof coated with a polymer composition,
said polymer composition comprising from about 50% to about 85% by weight of at least one polysiloxane polymer and from about 15% to about 50% by weight of at least one polyurethane based upon the total weight of said at least one polysiloxane polymer and said at least one polyurethane polymer, said polyurethane derived from at least one aliphatic or cycloaliphatic diisocyanate, said polyurethane being cured; from about 5 to about 35 parts by weight of a polyolefin per 100 total parts by weight of said one or more polysiloxanes and said one or more polyurethanes;
wherein said polymer composition contains less than about 10 parts by weight of a tackifier agent based upon 100 total parts by weight of said one or more polyurethanes and said one or more polysiloxanes; and
wherein said polymer composition contains less than about 10 parts by weight of a halogen containing polymer based upon 100 total parts by weight of said one or more polyurethanes and said one or more polysiloxanes.

19. The vehicle weatherstrip of claim 18, wherein the amount of said polysiloxane is from about 55% to about 80% by weight and wherein the amount of said polyurethane is from about 20% to about 45% by weight, wherein said polyurethane is derived from a polyether intermediate; and wherein said polyolefin comprises a polyethylene in an amount of from about 10 to about 30 parts by weight per 100 total parts by weight of said one or more polysiloxanes and said one or more polyurethanes.

20. The vehicle weatherstrip of claim 19, wherein the amount of said polysiloxane is from about 60% to about 75% by weight and wherein the amount of polyurethane is from about 25% to about 40% by weight; wherein said polysiloxane comprises poly(dimethylsiloxane); wherein said polyethylene has a weight average molecular weight of from about 2 million to about 5 million; wherein the amount of said tackifier agent is 2 parts by weight or less; and wherein the amount of said halogen containing polymer is 1 part by weight or less.

21. The vehicle weatherstrip of claim 18, wherein said weatherstrip has a noise level according to GM test GM9842P, Rev. A, of about 42 dBA or less.

22. The vehicle weatherstrip of claim 19, wherein said weatherstrip has a wet random noise level according to GM test GM9842P, Rev. A, of about 40 dBA or less; and wherein said polymer substrate is an acrylate, a vinyl or vinylidene polymer, a polyamide, a polyester, a polyurethane, a polyolefin, a thermoplastic olefin, or a thermoplastic elastomer, or combinations thereof.

23. The vehicle weatherstrip of claim 20, wherein said weatherstrip has a wet random noise level according to GM test GM9842P, Rev. A, of about 36 dBA or less, and wherein said substrate comprises a rubber, a thermoplastic elastomer, an acrylic, a polyamide, a urethane, or combinations thereof.

24. The vehicle weatherstrip of claim 18, wherein said weatherstrip according to ASTM Test D-1894-95 has an initial static coefficient of friction value of about 0.40 or less.

25. The vehicle weatherstrip of claim 20, wherein said weatherstrip according to ASTM Test D-1894-95 has an initial static coefficient of friction value of about 0.35 or less.

26. The vehicle weatherstrip of claim 21, wherein said weatherstrip according to ASTM Test D-1894-95 has an initial static coefficient of friction value of about 0.35 or less.

27. The vehicle weatherstrip of claim 23, wherein said weatherstrip according to ASTM Test D-1894-95 has an initial static coefficient of friction value of about 0.32 or less and wherein the static coefficient of friction is maintained for at least about 40 weeks.

* * * * *